Patented July 20, 1926.

1,592,955

UNITED STATES PATENT OFFICE.

THOMAS MIDGLEY, JR., OF DAYTON, OHIO.

MOTOR FUEL.

No Drawing.    Application filed January 22, 1926.  Serial No. 83,132.

This invention relates to internal combustion engine fuels, such, for example, as kerosene or gasoline, and its principal object is to employ with a motor fuel a volatile phenyl compound of a metal so that a combustible gaseous mixture containing the treated fuel can be burned under a higher compression pressure than when the fuel-air mixture alone is used.

This application is a continuation in part of my application Serial No. 553,270 filed April 15th, 1922.

By way of an example of one method of carrying out my invention, I dissolve by weight 1½ parts of lead tetra phenyl ($Pb(C_6H_5)_4$) in 100 parts of gasoline, form a gaseous mixture of this treated fuel and air and burn the gaseous mixture under compression in an engine. The presence of vapors of the lead tetra phenyl compound in the combustion chamber of the engine suppresses a fuel knock when the compression pressure of the engine is increased about fifty pounds above that at which the untreated fuel mixture may be used. The lead tetra phenyl may be introduced into the engine cylinder by adding it to the fuel mixture in the intake manifold or in the combustion chamber.

The process may be varied by changing the proportions, by using other motor fuels or by using in place of the lead tetra phenyl other phenyl compounds of metals which are volatile under engine conditions. These compounds include tetra phenyl tin, tri-phenyl stibine, tri-phenyl bismuthine, di-phenyl telluride and di-phenyl sellenide.

I claim:

1. An internal combustion engine fuel containing a volatile phenyl compound of a metal.

2. An internal combustion engine fuel containing a volatile phenyl compound of lead.

3. An internal combustion engine fuel containing tetra phenyl lead.

In testimony whereof I hereto affix my signature.

THOMAS MIDGLEY, JR.